F. G. WILSON.
ROLLER BEARING.
APPLICATION FILED OCT. 18, 1917. RENEWED AUG. 16, 1918.
1,312,936.
Patented Aug. 12, 1919.
2 SHEETS—SHEET 1.
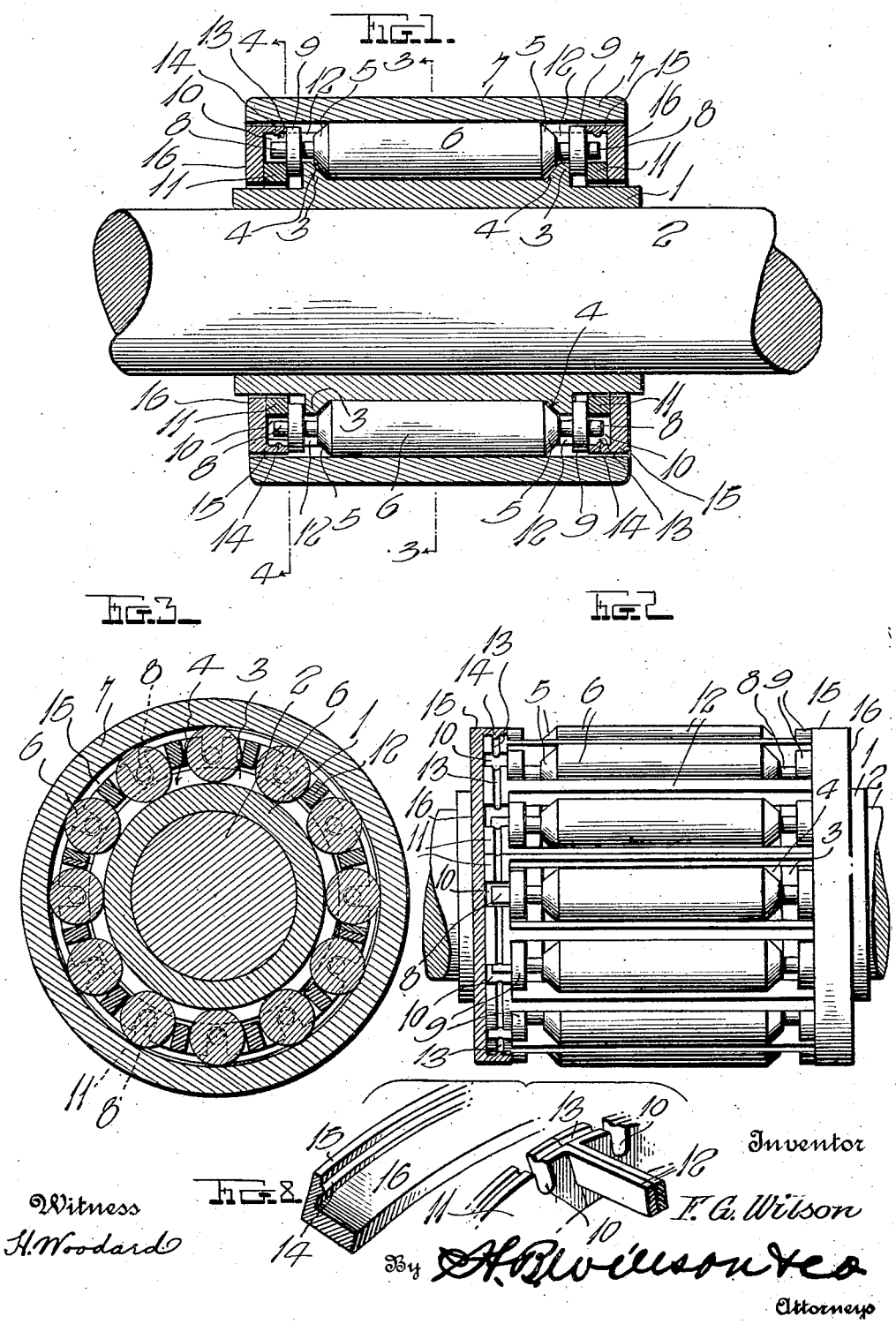
Witness
H. Woodard
Inventor
F. G. Wilson
By H. G. Wilson & Co.
Attorneys

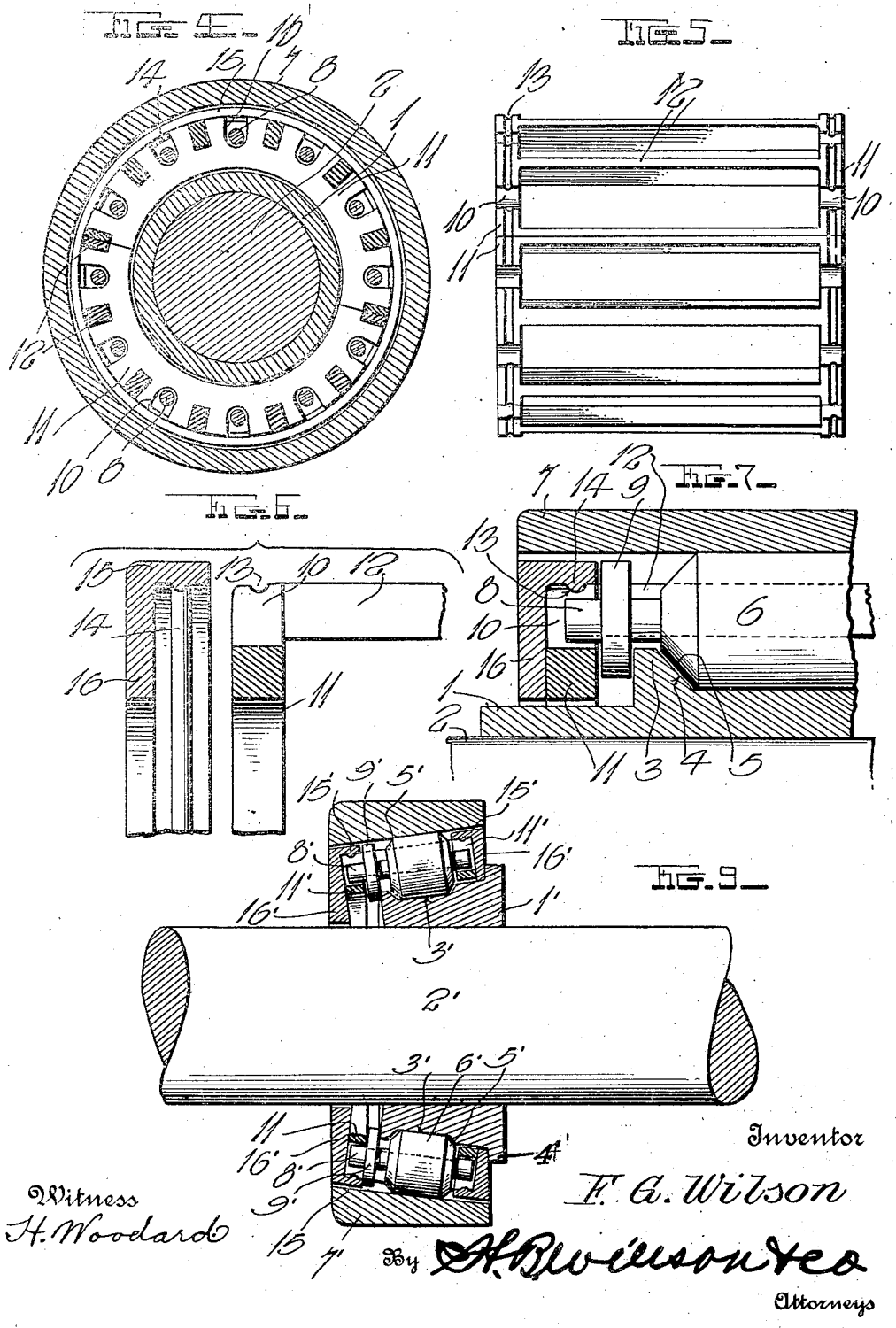

UNITED STATES PATENT OFFICE.

FRED G. WILSON, OF BROOKLYN, NEW YORK.

ROLLER-BEARING.

1,312,936. Specification of Letters Patent. Patented Aug. 12, 1919.

Application filed October 18, 1917, Serial No. 197,304. Renewed August 16, 1918. Serial No. 250,232.

*To all whom it may concern:*

Be it known that I, FRED G. WILSON, a citizen of the United States, residing at Brooklyn, in the county of Kings and State of New York, have invented certain new and useful Improvements in Roller-Bearings; and I do declare the following to be a full, clear, and exact description of the invention, such as will enable others skilled in the art to which it appertains to make and use the same.

My invention relates to roller bearings and has for one object to provide for the effective reinforcement of the end rings of the cage, by applying a pair of novel rings thereto to form therewith, rigid unitary end members.

Further objects are to so arrange the reinforcing rings as to exclude dust and other foreign matter from the bearing; to retain the roller pintles of certain forms of bearings in place by said rings, to utilize one of said rings as an end thrust, and to provide novel means for securing said rings in place upon the cage.

With the foregoing general object in view, the invention resides in the novel features of construction, and unique combinations of parts to be hereinafter fully described and claimed, the descriptive matter being supplemented by the accompanying drawings which form a part of this specification and in which:—

Figure 1 is a central longitudinal section of the improved bearing;

Fig. 2 is a side elevation thereof with one of the journal retaining rings in section;

Figs. 3 and 4 are transverse sections on the planes of the lines 3—3 and 4—4 respectively of Fig. 1;

Fig. 5 is a side elevation of the cage;

Fig. 6 is an enlarged vertical section showing more particularly the coacting bead and groove of one of the end rings of the cage and the adjacent journal retaining ring;

Fig. 7 is an enlarged detail section of the assembled bearing;

Fig. 8 is a detail perspective view of the parts illustrated in Fig. 6; and

Fig. 9 is a sectional view of a cone-type bearing.

In Figs. 1 to 8 of the drawings above briefly described, the numeral 1 designates a bearing sleeve which is shrunk or otherwise secured upon the shaft 2, said sleeve having a pair of circumferential thrust receiving ribs 3 on its exterior and located adjacent its ends, the inner opposed sides of said ribs being beveled at 4 to correspond with the beveled thrust receiving ends 5' of a plurality of bearing rollers 6 which contact with the periphery of the sleeve. A second sleeve or bushing 7 surrounds the rollers 6 and is adapted to be held against rotation by any preferred means not shown.

The ends of the rollers 6 are provided with journals 8 and the latter are equipped with annular circumferentially extending ribs 9 which contact with the outer sides of the ribs 3 to assist in receiving any endwise thrust which may be exerted upon the bearing. The outer ends of the journals 8 are received loosely in notches 10 formed in the outer edges of a pair of flat end rings 11 which surround the end portions of the sleeve 1. A plurality of tie rods or bars 12 extend between the end rings 11 and are suitably secured thereto to form therewith a cage for the bearing rollers 6, the latter being positioned between said rods or bars as shown clearly in the drawings. This cage is free to float as the rollers 6 travel upon the sleeves 1 and 7 and performs the usual function of preventing possible canting of the rollers.

In addition to the notches 10, each of the end rings 11 is provided, in its outer edge with a circumferential groove 13, and it may here be stated that each of said end rings is formed of two halves which abut each other on a diametrical line. This line of division may pass through one of the bars 12 as shown in Figs. 3 and 8, or it could well be located between said bars. It is in rigidly securing the two halves of the end rings together, that the groove 13 comes into play, said groove being adapted to receive a circumferential internal rib 14 on a reinforcing and journal retaining ring 15, one of said retaining rings surrounding each of the end rings and completely covering the outer edge thereof. The rings 15 close the outer ends of the notches 10 and thus prevent dislocation of the rollers 6 when the bearing is being either applied or removed, and these rings also serve to reinforce and hold the two halves of the end rings 11 in operative relation forming therewith rigid, unitary end members for the roller cage.

The rings 15 may be held in place by any preferred means and when the ribs 14 and grooves 13 are used, which is not in all cases necessary, said rings must be expanded for application to the end rings of the cage. This expansion may be accomplished by heating, or a steam press or the like may be employed for forcing said rings in place, so that the engagement of the ribs 14 with the end rings 11, will expand said rings 15 until they are properly positioned. The moment this takes place, however, the rib in question will snap into the groove 13 and will thus permanently hold the retaining rings in place.

Preferably employed in connection with the features of construction above described, are flat annular flanges 16 which extend inwardly from the outer edges of the retaining rings 15, said flanges contacting with the outer sides of the end rings 11 and serving to seal the outer sides of the notches 10, so that the entrance of dirt or other injurious matter is positively prevented. These flanges also serve as reinforcing means for the rings 15 to prevent possible breakage of the latter during the application thereof.

In the form of the invention illustrated in Fig. 9, the sleeve or inner bearing member 1' is of substantially conical shape and is provided with a suitable circumferential channel 3' in which the rollers 6' travel, said rollers having beveled ends 5' and suitable journals 8'. The ends 5' are adapted for thrust against the side walls of the channel, which walls thus form thrust shoulders. In this type of the device, only one of the journals is provided with a circumferential rib such as 9' and it will be observed that the sleeve 1' terminates in contact with the inner side of these ribs. End rings 11' are provided for holding the journals 8' in the manner above described and retaining rings 15' are provided, said rings having flanges 16' corresponding to the flanges 16 above described. It will be observed that whereas one flange 16' extends only to the sleeve 1', the other flange projects into close relation with the shaft 2', this construction being preferably followed although an arrangement more nearly approaching that above described, could well be employed if found desirable. A circumferential shoulder 4' on the larger end of the sleeve or bearing member 1' abuts the adjacent flange 16' to assist materially in receiving thrust in one direction.

The bushing or outer sleeve 7' will be properly tapered for engagement by the rollers 6' and it will thus be seen that the bearing will be an effective thrust device.

From the foregoing, taken in connection with the accompanying drawings, it will be obvious that although both forms of my invention are comparatively simple and inexpensive, they will be highly efficient and durable, particular emphasis being laid upon the provision of the rings 15 and 15' and their flanges 16—16', these parts serving not only to hold the sections of the end rings together, but acting also as means for preventing removal of the rollers 6—6', as reinforcing means for the end rings of the cage, and as means for excluding injurious matter. Also, one flange 16' acts as a thrust device. Since probably the best results are obtained from the several specific details shown and described, these details constitute the preferred form of the bearing, but I wish it understood that within the scope of the invention as claimed, numerous minor changes may well be made.

I claim:—

1. A roller bearing comprising a pair of flat end rings formed of segmental sections and each having circumferentially spaced notches in its edge and a circumferential groove in said edge, intersecting said notches, tie rods extending between said end rings and secured thereto between said notches, rollers between said tie rods and having journals received in said notches, and a pair of continuous journal retaining rings surrounding said end rings and spanning the notches thereof, said retaining rings having internal circumferential ribs received snugly in said circumferential grooves.

2. A roller bearing comprising a pair of flat end rings formed of segmental sections and each having circumferentially spaced notches in its edge and a circumferential groove in said edge, said notches opening through both the inner and outer sides of said end rings, tie rods extending between said end rings and secured thereto between said notches, rollers between said tie rods and having journals received in said notches, a pair of continuous journal retaining rings surrounding said end rings and having internal circumferential ribs received snugly in said circumferential grooves, and continuous flanges formed integrally with the outer edges of said retaining rings and extending inwardly toward the axis of the bearing in contact with the outer sides of said end rings to close said notches and prevent entrance of injurious matter.

3. In an anti-friction bearing, rolling bearing members, a cage for said members including end rings, and reinforcing rings mounted on said end rings and extending over the peripheries and outer sides of the latter to form therewith rigid unitary end members for the cage.

4. An anti-friction bearing comprising rollers, a cage for said rollers including end rings and a pair of reinforcing rings applied to the outer sides of said end rings and forming therewith rigid unitary end members for the cage, an outer bearing member surrounding said rollers and of a length to include the cage, and a rotary member surrounded by said rollers, said reinforcing rings having only slight clearance with said bearing member and with said rotary member to restrict the entrance of foreign matter into the bearing.

5. In an anti-friction bearing, rolling bearing members having pintles, a cage for said members including end rings having peripheral notches receiving said pintles, and reinforcing rings circumscribing said end rings and forming therewith rigid unitary end members for the cage, said reinforcing rings spanning said notches to retain said pintles therein.

6. A structure as specified in claim 5, said notches opening through the outer sides of said end rings, and said reinforcing rings having portions abutting said outer sides and closing said notches.

7. An anti-friction bearing comprising rollers, a cage for said rollers including a pair of annular end members, and an inner bearing member surrounded by said rollers, said inner bearing member having a shoulder for endwise thrust against said rollers, and also having an additional shoulder thrusting in the same direction against one of said end members.

8. An anti-friction bearing comprising rollers, a cage for said rollers including end rings, reinforcing rings applied to said end rings, and an inner bearing member surrounded by said rollers, said inner bearing member having a shoulder for endwise thrust against said rollers, and also having an additional shoulder thrusting in the same direction against one of said reinforcing rings.

In testimony whereof I have hereunto set my hand in the presence of two subscribing witnesses.

FRED G. WILSON.

Witnesses:
 FREDERICK KEIGHLEY,
 THEO. H. SCHREPPEL.